United States Patent [19]

Dieck

[11] 4,280,949

[45] Jul. 28, 1981

[54] MODIFIED POLYESTER COMPOSITIONS CONTAINING MINERAL FILLER

[75] Inventor: Ronald L. Dieck, Evansville, Ind.

[73] Assignee: General Electric Company, Pittsfield, Mass.

[21] Appl. No.: 11,681

[22] Filed: Feb. 12, 1979

[51] Int. Cl.³ .................. C08L 69/00; C08L 67/02
[52] U.S. Cl. .................. 260/40 R; 260/37 PC; 525/67
[58] Field of Search ............ 525/67; 260/40 R, 37 PC

[56] References Cited

U.S. PATENT DOCUMENTS

| 2,465,319 | 3/1949 | Whinfield et al. | 260/75 |
|---|---|---|---|
| 3,047,539 | 7/1962 | Pengilly | 260/75 |
| 3,591,659 | 7/1971 | Brinkman et al. | 260/873 |
| 3,833,685 | 9/1974 | Wambach | 260/860 |
| 3,864,428 | 2/1975 | Nakamura et al. | 260/873 |
| 3,953,404 | 4/1976 | Borman | 260/75 M |
| 3,959,209 | 5/1976 | Lake | 260/40 R |
| 3,963,669 | 6/1976 | Wurmb et al. | 260/40 R |
| 4,022,748 | 5/1977 | Schlichting et al. | 260/40 R |
| 4,034,013 | 7/1977 | Lane | 260/835 |
| 4,034,016 | 7/1977 | Baron | 260/858 |
| 4,044,073 | 8/1977 | Baron et al. | 260/860 |
| 4,052,356 | 10/1977 | Breitenfellner et al. | 260/40 R |
| 4,090,996 | 5/1978 | Gergen et al. | 260/40 R |
| 4,096,202 | 6/1978 | Farnham et al. | 260/873 |
| 4,111,893 | 9/1978 | Gasman et al. | 260/40 R |

*Primary Examiner*—Carman J. Seccuro
*Attorney, Agent, or Firm*—Morgan, Finnegan, Pine, Foley & Lee

[57] ABSTRACT

Modified thermoplastic polyester compositions are provided which comprise (a) a poly(1,4-butylene terephthalate) resin or polyester copolymer and, optionally, a poly(ethylene terephthalate) resin, (b) a modifier therefor comprising a combination of an acrylic or methacrylic monomer grafted polymer of a conjugated diene alone or combined with a vinyl aromatic and an aromatic polycarbonate, and (c) a mineral filler selected from clay, mica and/or talc alone or combined with glass fibers and, optionally, (d) a flame retardant. Modifier (b) and mineral filler (c) provide enhanced resistance to impact fracture, increased strength and improved resistance to heat distortion in articles molded from the compositions.

15 Claims, No Drawings

MODIFIED POLYESTER COMPOSITIONS CONTAINING MINERAL FILLER

This invention relates to modified thermoplastic polyester compositions which are moldable articles of improved impact strength and thermal resistance. More particularly, the invention pertains to compositions of (a) a poly(1,4-butylene terephthalate) resin or a polyester copolymer resin and, optionally, a poly(ethylene terephthalate) resin, which are modified with (b) an effective amount of a resinous combination comprising an acrylic or methacrylic monomer grafted polymer of a conjugated diene alone or combined with a vinyl aromatic and an aromatic polycarbonate and (c) a mineral filler alone or combined with glass fibers and, optionally (d) a flame retardant.

BACKGROUND OF THE INVENTION

High molecular weight linear polyesters and copolyesters of glycols and terephthalic or isophthalic acid have been available for a number of years. These are described inter alia in Whinfield et al, U.S. Pat. Nos. 2,465,319 and in Pengilly, 3,047,539, incorporated herein by reference. These patents disclose that the polyesters are particularly advantageous as film and fiber formers.

With the development of molecular weight control, the use of nucleating agents and two-step molding cycles, poly (ethylene terephthalate) has become an important constituent of injection moldable compositions. Poly(1,4-butylene terephthalate), because of its very rapid crystallization from the melt, is uniquely useful as a component in such compositions. Workpieces molded from such polyester resins, alone or combined with reinforcements, in comparison with other thermoplastics, offer a high degree of surface hardness and abrasion resistance, high gloss, and lower surface friction.

Stable polyblends of poly(1,4-butylene terephthalate) and poly(ethylene terephthalate) can be molded into useful unreinforced and reinforced articles. See Fox and Wambach, U.S. Pat. No. 3,953,394, incorporated herein by reference.

Block copolyesters containing units derived from poly(1,4-butylene terephthalate) and from an aromatic/aliphatic or aliphatic polyesters are also known. See, copending application U.S. Ser. No. 752,325, filed Dec. 20, 1976, incorporated herein by reference. Such block copolyesters are useful per se as molding resins and also in intimate combination with poly(1,4-butylene terephthalate) and/or poly(ethylene terephthalate.

It has been proposed to increase the impact strengths of polyesters by adding various modifiers. For example, Brinkmann et al in U.S. Pat. No. 3,591,659 disclose that a useful family of modifiers comprises polyalkyl acrylates, methacrylates and/or ethacrylates. Baron et al in U.S. Pat. No. 4,044,073 disclose that a useful impact modifier for such polyesters is an aromatic polycarbonate. Schlichting et al in U.S. Pat. No. 4,022,748 disclose that a rubber-elastic graft copolymer having a glass temperature below −20° C. is a useful modifier. Lane, U.S. Pat. No. 4,034,013, and Farnham et al, U.S. Pat. No. 4,096,202 disclose that useful impact modifiers comprise multiple stage polymers having a rubbery first stage and a hard final stage, preferably including units derived from alkyl acrylates, especially butyl acrylates. Baron et al in U.S. Pat. No. 4,034,016 (corres. German Pat. No. 2,650,870) disclose an impact modifier combination comprising a blend of a polyurethane and an aromatic polycarbonate. Copending application Ser. No. 870,679, filed Jan. 19, 1978, discloses an impact modifier combination comprising a segmented block copolyester and an aromatic polycarbonate. Copending application Ser. No. 957,801, filed Nov. 6, 1978, discloses an impact modifier combination comprising a blend of a polyalkylacrylate and an aromatic polycarbonate. Gergen et al, U.S. Pat. No. 4,090,996 disclose an impact modifier combination comprising a selectively hydrogenated monoalkenyl arene-diene block copolymer, and an engineering thermoplastic, e.g., poly(aryl ether), poly(aryl sulfone), polycarbonate, acetal, etc. Nakamura et al, U.S. Pat. No. 3,864,428, disclose poly(1,4-butylene terephthalate) or blends with other polyesters, impact modified with conjugated diene-vinyl copolymers grafted with methyl methacrylate and aromatic polycarbonates, filled and/or flame retardant. Nakamura et al do not disclose mineral fillers selected from clay, mica and/or talc. All of the foregoing patents and the applications are incorporated herein by reference.

It has now been discovered that such polyesters can be greatly improved in impact strength as molded as well as after annealing and at −20° F., by intimately admixing therewith an impact improving modifier combination comprising a conjugated diene/acrylic or methacrylic monomer graft copolymer resin and an aromatic polycarbonate resin and a mineral filler, selected from clay, mica and/or talc. They can be produced more readily in a variety of colors. As will also be shown, the new compositions of this invention can also be rendered flame-retardant.

DESCRIPTION OF THE INVENTION

According to this invention, there are provided thermoplastic compositions which are useful for molding, e.g., injection molding, compression molding, transfer molding, and the like, the compositions comprising:
  (a) a polyester comprising:
    (i) a poly(1,4-butylene terephthalate) resin;
    (ii) a blend of a poly(1,4-butylene terephthalate) resin and a poly(ethylene terephthalate) resin;
    (iii) a block copolyester of poly(1,4-butylene terephthalate) and an aromatic/aliphatic or aliphatic polyester;
    (iv) a blend of (iii) and a poly(ethylene terephthalate) resin; or
    (v) a blend of (iii) and a poly(1,4-butylene terephthalate) resin;
  (b) an impact modifier therefor comprising a combination of:
    (i) an acrylic or methacrylic monomer grafted copolymer of a conjugated diene alone or combined with a vinyl aromatic monomer; and
    (ii) an aromatic polycarbonate resin, in an amount of up to 60 parts per 100 parts by weight of (a) and (b) together; and
  (c) an effective amount of a mineral filler therefor selected from clay, mica and/or talc, alone or in combination with reinforcing fibrous glass.

The polyester resins (a) of the compositions of this invention are available commercially or can be prepared by known techniques such as by the alcoholysis of esters of terephthalic acid with ethylene glycols with the free acids or with halide derivatives thereof, and similar processes. These are described in U.S. Pat. Nos. 2,465,319, and 3,047,359, and elsewhere. As has been mentioned, preparation of the block copolyesters is described in Borman, Dolce and Kramer, U.S. Ser. No. 752,325, filed Dec. 20, 1976, and incorporated herein by reference.

Illustratively, the high molecular weight polyesters will have an intrinsic viscosity of at least about 0.4 deciliters/gram and preferably, at least 0.6 deciliters/grams as measured in a 60:40 phenol/tetrachloroethane mixture at 30° C.

Especially useful when high melt strength is important are branched high melt viscosity poly(1,4-butylene terephthalate) resins, which include a small amount of e.g., up to 5 mole percent based on the terephthalate units, of a branching component containing at least three ester forming groups. The branching component can be one which provides branching in the acid unit portion of the polyester, or in the glycol unit portion, or it can be a hybrid. Illustrative of such branching components are tri- or tetracarboxylic acids, such as trimesic acid, pyromellitic acid, and lower alkyl esters thereof, and the like, or preferably, polyols, and especially preferably, tetrols, such as pentaerythritol, triols, such as trimethylolpropane; or dihydroxy carboxylic acids and hydroxydicarboxylic acids and derivatives, such as dimethyl hydroxyterephthalate, and the like.

The branched poly(1,4-butylene terephthalate) resins and their preparation are described in Borman, U.S. Pat. No. 3,953,404, incorporated herein by reference.

Impact modifier (b) comprises a combination of (i) a resin of a conjugated diene/vinyl copolymer grafted with acrylic or methacrylic monomer and (ii) an aromatic polycarbonate. The block copolymer resins (b)(i) can be made in known ways and they are available commercially from Borg-Warner Corp. under the trade designation BLENDEX, and from Kanegafuchi Chemical Industry Co., under the trade designation KANE-ACE. Any of the resins in U.S. Pat. No. 3,864,428 can be used, especially those containing units derived from butadiene or isoprene, alone or in further combination with a vinyl aromatic compound. Especially preferably, graft copolymer component (b)(i) will comprise a copolymer of styrene and butadiene onto which has been grafted a $C_1$-$C_6$ alkyl methacrylate monomer, particularly methyl methacrylate. The polycarbonate resins (b)(ii) can be made in known ways and they are available commercially from sources, e.g., General Electric Company, Pittsfield, Mass., U.S.A., under the trademark LEXAN. In general, any of the aromatic polycarbonates described in Baron et al, U.S. Pat. No. 4,034,016 can be used, especially those including units derived from bisphenol-A.

The fillers will comprise mineral fillers, such as clay, mica and/or talc and preferably clay, and especially that form of clay known as calcined kaolin. It is also contemplated that the fillers can be combined with reinforcing fillers, such as fibrous glass and the like. The fillers can be untreated, but preferably, they will be treated with silane or titanate coupling agents, etc. Especially preferred is kaolin clay surface treated with a silane coupling agent known as gamma aminopropyl triethoxysilane and sold by Union Carbide Corp., under the trade designation A-1100 (GAP). The coupling agent can be applied to the mineral filler by several means. It can be tumble blended, or it can be deposited, e.g., from solution in aqueous methanol.

The amount of the filler can vary widely depending on the formulation and needs of the particular composition. Preferably, however, the mineral filler will comprise from about 90%, preferably from about 2 to about 40% by weight of filler (c) and (a) and (b), combined. Especially preferably the filler will comprise less than about 35% by weight of the combination.

It has further been found that even relatively minor amounts of the modifier (b) are effective in providing significant improvements in impact strength, and the like. In general, however, the modifier (b) will be present in amounts of at least about 1% by weight, preferably from about 2.5 to about 50% by weight of (a) and (b). The ratio of graft copolymer to aromatic polycarbonate can vary widely, i.e., within the range of 1 to 99 parts of the former to, correspondingly, 99 to 1 parts of the latter, but in general, from 60 to 40 parts of the graft copolymer will be present for each 40 to 60 parts of the aromatic polycarbonate per 100 parts by weight of (b).

The impact modified polyesters in combination with a filler can be rendered flame retardant with an effective amount of a conventional flame retardant agent (d). As is well known, flame retardants can be based on elementary red phosphorus, phosphorus compounds, halogen and nitrogen compounds alone or preferably in further combination with synergists, such as antimony compounds. Especially useful are polymeric and oligomeric flame retardant agents comprising tetrabromobisphenol-A carbonate units; see, for example, Wambach, U.S. Pat. No. 3,833,685, which is incorporated herein by reference.

Other ingredients, such as dyes, pigments, drip retardants, and the like can be added for their conventionally employed purposes.

The compositions of this invention can be prepared by a number of procedures. In one way, the modifier and mineral filler or fire retardants is put into an extrusion compounder with resinous components to produce molding pellets. The modifier and mineral filler and optional glass fibers are dispersed in a matrix of the resin in the process. In another procedure, the modifier and mineral filler and optional glass is mixed with the resins by dry blending, then either fluxed on a mill and comminuted, or then are extruded and chopped. The modifying agent and mineral filler and optional glass can also be mixed with the resins and directly molded, e.g., by injection or transfer molding techniques.

It is always important to thoroughly free all of the ingredients; resin, modifier, mineral filler, and any optional, conventional additives from as much water as possible.

In addition, compounding should be carried out to ensure that the residence time in the machine is short; the temperature is carefully controlled; the friction heat is utilized; and an intimate blend between the resin, the modifier and the filler is obtained.

Although it is not essential, best results are obtained if the ingredients are pre-compounded, pelletized and then molded. Pre-compounding can be carried out in conventional equipment. For example, after carefully pre-drying the polyester and modifier and the mineral filler, e.g., 4 hours at 250° F., a single screw vacuum vented extruder is fed with a dry blend of the ingredients, the screw employed having a long transition section to ensure proper melting. On the other hand, a twin screw extrusion machine, e.g., a 53 mm Werner Pfleiderer machine can be fed with resin and additives at the feed port and mineral down stream. In either case, a generally suitable machine temperature will be about 450° to 560° F.

The pre-compounded composition can be extruded and cut up into molding compounds such as conventional granules, pellets, etc., by standard techniques.

The composition can be molded in any equipment conventionally used for glass-filled thermoplastic compositions, e.g., a Newbury type injection molding machine with conventional cylinder temperatures, e.g., 450°–535° F. and conventional mold temperatures, e.g., 130°–200° F.

DESCRIPTION OF THE PREFERRED EMBODIMENTS

The following examples illustrate the invention. They are set forth as a further description but are not to be construed as limiting the invention thereto. In the data tables, the abbreviation "N.D." means not determined. All parts are by weight.

EXAMPLES 1 and 2

Dry blends of poly(1,4-butylene terephthalate) resin and/or poly(ethylene terephthalate) (PET), methyl methacrylate grafted butadiene/styrene copolymer, aromatic polycarbonate of bisphenol-A and phosgene, mineral filler and mold release/stabilizer are compounded and extruded at 520° F. in an extruder. The extrudate is pelletized and injection molded at 520° F. (mold temperature 150° F.). The formulations and physical properties are shown in Table 1.

TABLE 1

Compositions Comprising Polyester, Graft Copolymer, Aromatic Polycarbonate and Clay

| Example | 1 | 2 |
|---|---|---|
| Composition (parts by weight) | | |
| Poly(1,4-butylene terephthalate)[(a) (i)] | 39.5 | 24.5 |
| Poly(ethylene terephthalate) | — | 15.0 |
| MMBS Graft copolymer[(b) (i)] | 15 | 15.0 |
| Aromatic polycarbonate[(b) (ii)] | 15 | 15.0 |
| Santintone Clay[(c)] | 30 | 30.0 |
| Mold/release stabilizers (to make 100%) | | |
| Properties | | |
| Distortion Temperature Under Load, °F. at 264 psi | 178 | 175 |
| Notched Izod impact, ft.lbs./in. ⅛" | 1.58 | 1.34 |
| Unnotched Izod impact, ft.lbs. ⅛" | 37.6 | 31 |
| Flexural strength, psi | 12,374 | 13,200 |
| Flexural modulus, psi | 500,600 | 486,400 |
| Tensile strength, psi | 7,488 | 7,226 |
| Elongation, % | 14.3 | 11.9 |

[(a) (i)] Valox 315, General Electric Co., melt viscosity 7250-9000 poise.
[(b) (i)] Kane-Ace, B-28 Kanegafuchi Chemical Industry Co., methacrylate grafted butadiene/styrene copolymer.
[(b) (ii)] LEXAN 105, General Electric Co.
[(c)] Englehard Co., New Jersey U.S.A., treated with 0.13% by weight of A-1100, gammaaminopropyltriethoxysilane coupling agent.

EXAMPLE 3

The procedure of Example 1 is used to prepare a flame retarded composition of poly(1,4-butylene terephthalate), methacrylate grafted butadiene-styrene copolymer, aromatic polycarbonate, clay filler and flame retardants. The formulation and physical properties are set forth in Table 2.

TABLE 2

Composition Comprising Polyester, Graft Copolymer, Aromatic Polycarbonate, Clay and Flame Retardants.

| Example | 3 |
|---|---|
| Composition (parts by weight) | |
| Poly(1,4-butylene terephthalate)[(a) (i)] | 36.8 |
| MMBS Graft copolymer[(b) (i)] | 10 |
| Aromatic polycarbonate[(b) (ii)] | 10 |
| Satintone clay[(c)] | 30 |
| Decabromodiphenyl ether | 7 |
| Antimony oxide | 6 |
| Mold Release/stabilizer (to make 100) | |
| Properties | |
| Distortion temperature under load, °F. at 264 psi | 177 |
| Notched Izod impact, ft.-lbs./in., ⅛" | 7 |
| Unnotched Izod impact, ft.-lbs./in., ⅛" | 12.0 |
| Flexural strength, psi | 14,400 |
| Flexural modulus, psi | 614,000 |
| Tensile strength, psi | 8250 |
| Elongation, % | 4.5 |

[(a) (i), (b) (ii), (c)] See footnotes to Table 1
[(b) (i)] BLENDEX BTA-111S from Borg-Warner Corp.

Obviously, other modifications and variations of the present invention are possible in the light of the above teachings. For example, the mineral filled compositions can be made with mica or talc, and the poly(1,4-butylene terephthalate) and/or poly(ethylene terephthalate) can be replaced with a copolyester. In addition, part of the clay can be replaced with reinforcing fibrous glass. It is therefore, to be understood that changes may be made in the particular embodiments described above which are within the scope of the invention as defined in the appended claims.

I claim:

1. A thermoplastic composition comprising:
   (a) a polyester composition comprising:
      (i) a poly(1,4-butylene terephthalate) resin;
      (ii) a blend of a poly(1,4-butylene terephthalate) resin and a poly(ethylene terephthalate) resin;
      (iii) a block copolyester of poly(1,4-butylene terephthalate) and an aromatic/aliphatic or aliphatic polyester;
      (iv) a blend of (iii) and a poly(ethylene terephthalate) resin; or
      (v) a blend of (iii) and a poly(1,4-butylene terephthalate) resin;
   (b) an impact modifier therefor comprising a combination of:
      (i) an acrylic or methacrylic monomer grafted polymer of a conjugated diene alone or combined with a vinyl aromatic monomer; and
      (ii) an aromatic polycarbonate resin, in an amount of up to 60 parts per 100 parts by weight of (a) and (b) together; and
   (c) an effective amount to improve impact strength after annealing and at −20° C. of mineral filler therefor selected from clay, mica, talc or a mixture of any of the foregoing.

2. A composition as defined in claim 1 wherein the impact modifier (b) is present in an amount of at least about 1.0 parts by weight per 100 parts by weight of (a) and (b) together.

3. A composition as defined in claim 1 wherein the impact modifier (b) is present in an amount of from about 2.5 to about 50 parts by weight per 100 parts by weight of (a) and (b) together.

4. A composition as defined in claim 1 wherein the mineral filler (c) comprises calcined kaolin clay.

5. A composition as defined in claim 4 wherein said clay filler is a silane coupling agent surface-treated clay.

6. A composition as defined in claim 1 wherein said filler component (c) is present in an amount of from about 1 to about 60 parts by weight per 100 parts by weight of (a), (b) and (c) together.

7. A composition as defined in claim 1 wherein each said polyester in component (a) has an intrinsic viscosity of at least about 0.4 deciliters/gram when measured in a solution in a 60:40 mixture of phenol and tetrachloroethane at 30° C.

8. A composition as defined in claim 7 wherein each said polyester in component (a) has an intrinsic viscosity of at least about 0.6 deciliters per gram when measured in a solution in a 60:40 mixture of phenol and tetrachloroethane at 30° C.

9. A composition as defined in claim 1 wherein in components (a)(i), (a)(ii) and (a)(v), said poly(1,4-butylene terephthalate) resin is linear or branched.

10. A composition as defined in claim 9 wherein said branched polyester is a high melt viscosity (1,4-butylene terephthalate) resin which includes a small amount of a branching component containing at least three ester forming groups.

11. A composition as defined in claim 1 wherein in said graft copolymer resin component (b)(i), the conjugated diene polymer comprises butadiene or isoprene, alone, or in combination with a vinyl aromatic compound and the grafted monomer is a methacrylic monomer.

12. A composition as defined in claim 11 wherein said graft copolymer units of butadiene, styrene and a $C_1$-$C_6$ alkyl methacrylate.

13. A composition as defined in claim 12 wherein in said graft copolymer the $C_1$-$C_6$ alkyl methacrylate is methyl methacrylate.

14. A composition as defined in claim 1 wherein said aromatic polycarbonate resin includes units derived from bisphenol-A.

15. A composition as defined in claim 1 which also includes (d) a flame-retardant amount of a flame-retarding agent.

* * * * *